Oct. 3, 1933.  V. P. WILLIAMS  1,929,009
SEALING DEVICE AND RESILIENT THRUST WASHER
Filed May 15, 1933   2 Sheets-Sheet 1
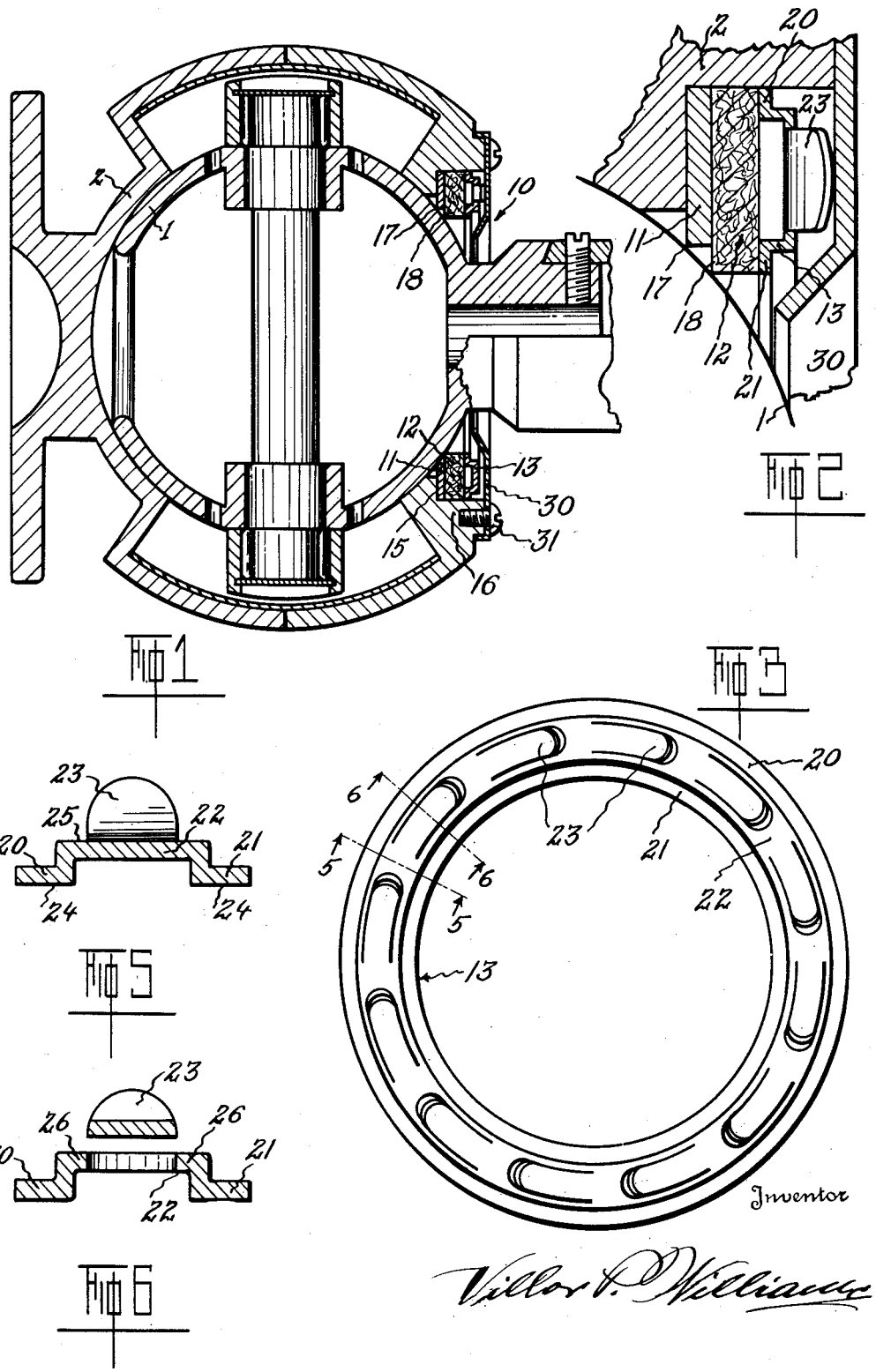

Oct. 3, 1933.    V. P. WILLIAMS    1,929,009

SEALING DEVICE AND RESILIENT THRUST WASHER

Filed May 15, 1933    2 Sheets-Sheet 2

Inventor
Villas P. Williams

Patented Oct. 3, 1933

1,929,009

UNITED STATES PATENT OFFICE 1,929,009

SEALING DEVICE AND RESILIENT THRUST WASHER

Villor P. Williams, Baltimore, Md., assignor to The Williams Engineering Corporation, a corporation of Maryland Application May 15, 1933. Serial No. 671,217

6 Claims. (Cl. 286—15)

This invention relates to a packing or sealing device primarily adapted for use in bearing constructions to prevent the escape of lubricant, and is a continuation in part of my co-pending application Serial No. 634,393, filed September 22, 1932.

An object of this invention is the provision of a packing assembly comprising a packing element adapted to be acted upon by a resilient thrust washer of such characteristics as to react on the packing element with a uniform pressure upon compression of said thrust washer, to form a simple, compact and efficient packing.

Another object of this invention is the provision of a packing assembly as above set forth for use in a universal or ball and socket joint wherein the packing assembly functions in cooperation with a scraping ring that bears against the ball part of the joint, the packing element also bearing on the ball part, all in the manner to be hereinafter described.

A further object of this invention relates to the resilient thrust washer which is made from a sheet metal stamping and so designed as to be practically non-deformable to lateral bending stresses, the resilient portions thereof being struck out of the body portion of said washer. Thus thrust washer in operation, will react uniformly without any deformation against an abutting member upon compression of the resilient portions thereof.

For a better understanding of the nature and objects of the present invention, reference is made to the following specifications in which are described the preferred embodiments of the invention, illustrated in the accompanying drawings.

In the accompanying drawings:—

Fig. 1 is a sectional elevational view of a universal joint showing the arrangement of the packing assembly.

Fig. 2 is a detail of an enlarged sectional view showing the relationship of the elements comprising the packing assembly with respect to the ball member of the universal joint.

Fig. 3 is a plan view of the resilient thrust washer.

Figs. 5 and 6 are sectional views of the washer taken on lines 5—5 and 6—6, respectively, on Figure 3.

Figure 7:
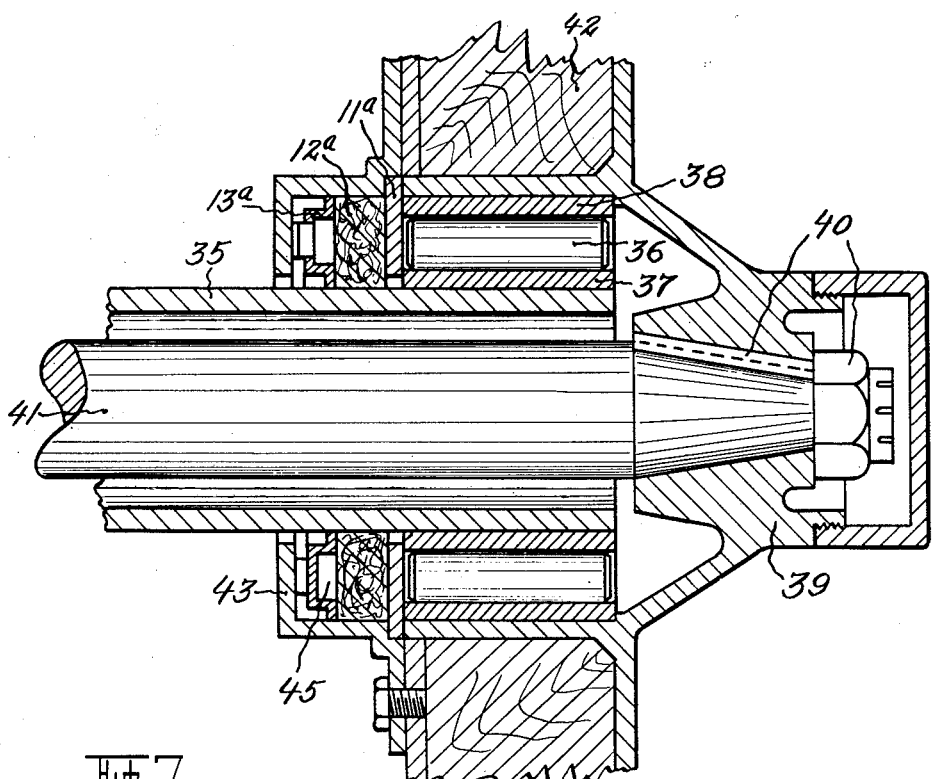

Fig. 7 is a sectional view showing the application of the packing assembly to a full floating type of axle.

The universal joint shown in Fig. 1 consists essentially of a hollow ball 1, operatively positioned within a socket 2, the details of construction of this joint being fully set forth in the above identified copending application. To seal the joint against leakage of lubricating oil and to prevent the entry of foreign matter between the bearing surfaces of the joint, there is provided a packing assembly generically indicated in Fig. 1 by the reference character 10. The packing assembly is made up of an annular rigid ring 11, an annular packing element of cork, felt or any other suitable material 12, and an annular resilient thrust washer 13.

As will be observed, the socket member 2 of the universal joint is provided with a depressed shoulder 15 and a flanged cylindrical housing 16. Seated in said housing 16 and abutting the shoulder 15 is the rigid ring 11 which is preferably made of an external diameter to snugly fit within the cylindrical housing 16. The inner diameter of the ring 11 is such that the inner peripheral edge thereof as at 17 is adapted to intimately engage the surface of the ball member 1. Preferably this edge of the ring 11 is hardened and made in the form of a knife edge whereby the same is adapted to scrape the oil over the surface of the ball member 1 as the same moves angularly in its socket 2.

Placed adjacent the ring 11 is an annular packing element which as stated above may be of cork or any other suitable material. This packing element has an external diameter equal to that of the ring 11, the inner diameter thereof, however, being made smaller so that the inner portion of the packing element 12 will overlap the edge 17 of the ring 11 as at 18 to positively engage the surface of the ball member 1, as shown most clearly in Fig. 2.

To resiliently maintain the ring 11 and packing element 12 tightly pressed against the surface of the ball 1, there is provided a resilient thrust washer 13. Referring to Figs. 3, 5 and 6 it will be noted that the washer 13 is annular in shape and is preferably made from a sheet metal stamping. The annular stamping comprises concentric seat portions 20 and 21, integrally connected together by a raised or arched body portion 22 from which is struck out the circular row of projecting spring tongues 23. As shown in Figs. 5 and 6, the seats 20 and 21 are arranged in the same plane and are provided with substantial flat undersurfaces 24. The top surface of the arched portion 22 is preferably similarly provided with a flat surface 25 parallel to the plane of the seats 20—21.

Figure 4:
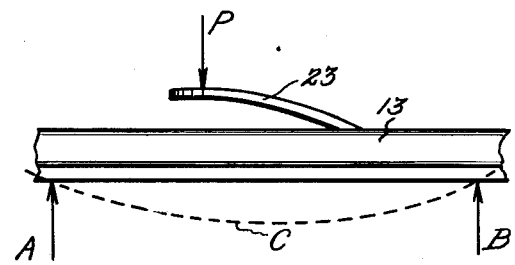
Fig. 4 shows in end elevation a portion of the washer and its reaction to a superposed load.

As heretofore expressed, the spring tongues 23 are struck out of the arched body portion 22 and project angularly equal distances above the plane thereof in the manner shown in Fig. 4. The width of the spring tongues 23 is made somewhat less than the width of the arched portion 22, see Fig. 6, so that there is provided on each side of the spring tongues reinforcing shoulders 26 which add materially to the rigidity of the washer at points laterally adjacent said spring tongues.

The construction and arrangement of the parts of the thrust washer 13 are such as to provide an annular member of extreme rigidity, highly resistant to lateral bending stresses. This characteristic has not been evident in the well known spring washers of this type by virtue of the fact that said washers are primarily flat and in cross section rectangular. In the spring thrust washer 13 described above, a cross section thereof will show that the same is of an inverted U-shape, the entire washer being consequently of channel form. Such a construction is structurally very stiff and will not bend under the reaction set up by the compression of the spring tongues 23. This is admirably shown in Fig. 4, wherein a portion of the thrust washer is shown in end elevation, assuming the section of the washer 13 to be a beam supported on the points of support A—B. The application of a load or pressure P on the spring tongue 23 intermediate the supports A—B will not have any appreciable effect in causing the washer to bend as would be the case were the washer to be of flat or rectangular form in cross section which due to its lack of rigidity would then be bent under the action of P as indicated by the dotted lines C.

As a result of this arched or channel construction of the thrust washer it becomes apparent that a compression of the spring tongues 23 thereon will cause the same or more particularly the seats 20—21 to react with a uniform pressure around the entire peripheries thereof on the juxtaposed packing element 12.

Referring again to Fig. 2 it will be seen that the seats 20—21 of the thrust washer press against the outer and inner portions of the surface of the packing element adjacent the respective outer and inner edges thereof where pressure is most essential in order to maintain an efficient oil seal. The portion 18 of the packing element 12 which overlaps the ring 11 is directly engaged by the seat 21 which always exerts sufficient pressure to tightly maintain the packing element 12 in contact with the surface of the ball 1.

To compress the spring tongues 23 and to retain the packing assembly in position there is provided a cap 30 which is securely fastened to the socket housing 16 by screws 31. With the cap 30 in position, compressing all of the spring tongues 23, the thrust washer 13 will accordingly react in the manner described above to automatically uniformly press the packing element 12 and ring 11 together against the ball member 1, thus establishing an oil seal of high efficiency.

While the oil seal or packing assembly as described above is shown used in a universal joint it is obvious that such a seal has other applications. An example of one such application is shown in Fig. 7 wherein there is disclosed a full floating type of axle, in which 35 designates the rear axle housing. Mounted on the end of the axle housing 35 is a roller bearing 36, the inner race 37 being secured to the end of the axle housing and the outer race 38 to the hub 39 which is non-rotatably fastened as at 40 in a conventional manner to the tapered end of the axle 41, the hub accordingly riding on the roller bearing 36, in the manner well known. Positioned on the hub 39 is a wheel 42, and mounted over the axle housing 35 and secured to the inner face of the wheel 42 and hub 39 is a flanged cap 43, adapted to have placed therein a packing assembly 45 substantially similar to the packing assembly 10 of Fig. 1.

The packing assembly 45 comprises an abutment ring 11$^a$, a packing element 12$^a$, of cork, felt or any other suitable material and a resilient thrust washer 13$^a$ all of which are initially placed within the cap 42, the cap being of such a depth that upon securing of the same to the hub 39 the spring tongues 23$^a$ of the thrust washer 13$^a$ will be compressed. The action of the resilient washer 13$^a$ on the packing element 12$^a$ is exactly the same as described above with respect to the thrust washer 13 in the packing assembly 10.

From the foregoing it will be appreciated that an extremely simple and efficient packing assembly or sealing device has been produced by virtue of the unique construction of the resilient thrust washer, and that furthermore the parts are of simple construction, easily assembled and of low manufacturing cost.

While a preferred embodiment of the packing assembly has been illustrated and described it is to be distinctly understood that various changes may be resorted to in the construction and use of the same within the scope of the appended claims.

I claim:

1. In a universal joint of the ball and socket type, an oil seal and bearing member carried by the female member and engaging the ball member, comprising an annular ring having a knife edge engaging the surface of the ball member to scrape the surface of lubricant, a composition packing member on the ring and formed with one edge engaging the surface of the ball to wipe the same and form a dust proof joint, and a combination washer and spring member on the packing member and having a plurality of upstanding spring fingers, and a cover plate engaged by the spring fingers and attached to the female member, said fingers inducing a constant and automatically adjustable pressure on the packing against the surface of the ball.

2. In a universal joint, an oil seal and bearing member for the working parts thereof, including an annular part with a knife edge bearing against a working part of the joint to scrape the same and prevent seepage of lubricant therefrom, a packing member on said annular part, and a combination washer and spring tensioning device including a plurality of spaced spring fingers bearing against a fixed support to induce a constant tension and pressure on the packing and annular part.

3. In a universal joint of the ball and socket type, an oil seal and bearing member carried by the female element and engaging the male element, and comprising an annular flat ring formed with one knife edge engaging the surface of the male or ball member, a combination washer and spring tensioning member having a plurality of spaced annularly aligned fingers, packing between the ring and the washer, and a cover plate against which the fingers bear to automatically cause the washer to press against the packing and ring.

4. In a universal joint, an oil seal and bearing member for the working parts thereof comprising an annular part with a knife edge bearing against a working part of the joint, a packing member having a greater diameter than the annular part for engaging said working part of the joint to remove dust and grit therefrom, a combination spring and washer member having a raised part formed with spring fingers, and flattened edge parts engaging the packing to press upon the same, and a support against which said fingers bear.

5. A thrust washer comprising a central upstanding body portion, laterally directed flat seat portions integral with said body portion and arranged in a plane different therefrom, said body and seat portions forming a substantially rigid trough shaped member highly resistant to lateral bending stresses, and a plurality of spring tongues integral with said body portion and projecting from the side of said body portion opposite said seat portions.

6. In combination with cooperating bearing members, a housing on one of said members, an oil seal in said housing comprising a yieldable annular sealing element and a resilient annular thrust washer disposed adjacent thereto, said washer being formed with concentric seats and an intermediate arched body portion integral therewith, a plurality of circumferentially arranged spring tongues struck out from said body portion and projecting angularly from the plane thereof on the side opposite said seats, a cover cap secured to said housing and adapted to depress said spring tongues to resiliently press said washer against said sealing element, said spring tongues expanding automatically in proportion to the wear on said sealing element while maintaining substantially the same degree of pressure of said washer thereagainst.

VILLOR P. WILLIAMS.